US010559214B2

(12) United States Patent
Dow et al.

(10) Patent No.: US 10,559,214 B2
(45) Date of Patent: *Feb. 11, 2020

(54) PROVIDING LIVE FEEDBACK USING A WEARABLE COMPUTING DEVICE (71) Applicant: INTERNATIONAL BUSINESS MACHINES CORPORATION, Armonk, NY (US)

(72) Inventors: Eli M. Dow, Wappingers Falls, NY (US); Thomas D. Fitzsimmons, Poughkeepsie, NY (US); Steven K. Schmidt, Hinesburg, VT (US); Charles J. Stocker, IV, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 384 days.

This patent is subject to a terminal disclaimer.

(21) Appl. No.: 14/865,807

(22) Filed: Sep. 25, 2015

(65) Prior Publication Data

US 2017/0092141 A1    Mar. 30, 2017

(51) Int. Cl.
G09B 5/02       (2006.01)
H04B 1/3827    (2015.01)
H04L 12/24     (2006.01)
G09B 5/06       (2006.01)

(52) U.S. Cl.
CPC .............. G09B 5/02 (2013.01); G09B 5/065 (2013.01); H04B 1/385 (2013.01); H04L 41/22 (2013.01)

(58) Field of Classification Search
CPC ...................................................... G09B 5/02
USPC ....................................................... 434/247
See application file for complete search history.

(56) References Cited

U.S. PATENT DOCUMENTS 5,791,351 A  *  8/1998  Curchod .............. A61B 5/1121
                                                        600/587
7,771,318 B2    8/2010  Narayanaswami
8,979,665 B1 *  3/2015  Najafi ................ G09B 19/0038
                                                        473/269

(Continued)

FOREIGN PATENT DOCUMENTS

CN        2867997 Y    2/2007
EP        2620187 A1   7/2013

(Continued)

OTHER PUBLICATIONS

U.S. Appl. No. 15/063,904, filed Mar. 8, 2016—This Reference Is Not Attached Because It Is Readily Available to the Examiner.

(Continued)

Primary Examiner — Kesha Frisby
(74) Attorney, Agent, or Firm — Maeve M. Carpenter (57) ABSTRACT In an approach to providing feedback to a user using a wearable computing device, a computer records an activity being performed by a user operating a wearable computing device, and identifies the activity being performed by the user. The computer retrieves performance data corresponding to the activity being performed by the user, and determines, based on the retrieved performance data and the recorded activity being performed by the user, whether the user deviates from the retrieved performance data. Responsive to determining the user deviates from the retrieved performance data, the computer transmits, based on the retrieved performance data, performance feedback to the user.

13 Claims, 3 Drawing Sheets (56) References Cited

U.S. PATENT DOCUMENTS

| | | | | |
|---|---|---|---|---|
| 2008/0254419 | A1* | 10/2008 | Cohen | G09B 7/00 |
| | | | | 434/219 |
| 2012/0143358 | A1* | 6/2012 | Adams | G06F 3/011 |
| | | | | 700/92 |
| 2012/0249540 | A1 | 10/2012 | Yoshino | |
| 2013/0074679 | A1 | 3/2013 | Minamitaka | |

FOREIGN PATENT DOCUMENTS

| | | |
|---|---|---|
| JP | 2010198085 A | 9/2010 |
| WO | 2006042358 A1 | 4/2006 |
| WO | 2015032545 A1 | 3/2015 |

OTHER PUBLICATIONS

List of IBM Patents or Patent Applications Treated as Related (Appendix P), filed Herewith.

\* cited by examiner

PROVIDING LIVE FEEDBACK USING A WEARABLE COMPUTING DEVICE

BACKGROUND OF THE INVENTION

The present invention relates generally to the field of wearable computing devices, and more particularly to providing live feedback of a user activity using a wearable computing device.

With increased availability of wearable computing device technology, users are able to apply a filter between their eyes and the world, the filter accessing a variety of information. Wearable computing devices can overlay this information on a real time environment that a user is viewing. The overlay of information may be able to assist the user in any of a number of ways, such as determining which restaurant to visit, for example, by overlaying reviews of one or more restaurants on a row of buildings a user is looking at using the wearable computing device, or providing directions to a user walking in an unfamiliar city while wearing the computing device.

SUMMARY

Embodiments of the present invention disclose a method, a computer program product and a computer system for providing feedback to a user using a wearable computing device. The method includes recording, by one or more computer processors, an activity being performed by a user operating a wearable computing device and identifying, by one or more computer processors, the activity being performed by the user. The method includes retrieving, by one or more computer processors, performance data corresponding to the activity being performed by the user and determining, by one or more computer processors, based on the retrieved performance data and the recorded activity being performed by the user, whether the user deviates from the retrieved performance data. Responsive to determining the user deviates from the retrieved performance data, the method includes transmitting, by one or more computer processors, based on the retrieved performance data, performance feedback to the user.

DETAILED DESCRIPTION

Figure 1:
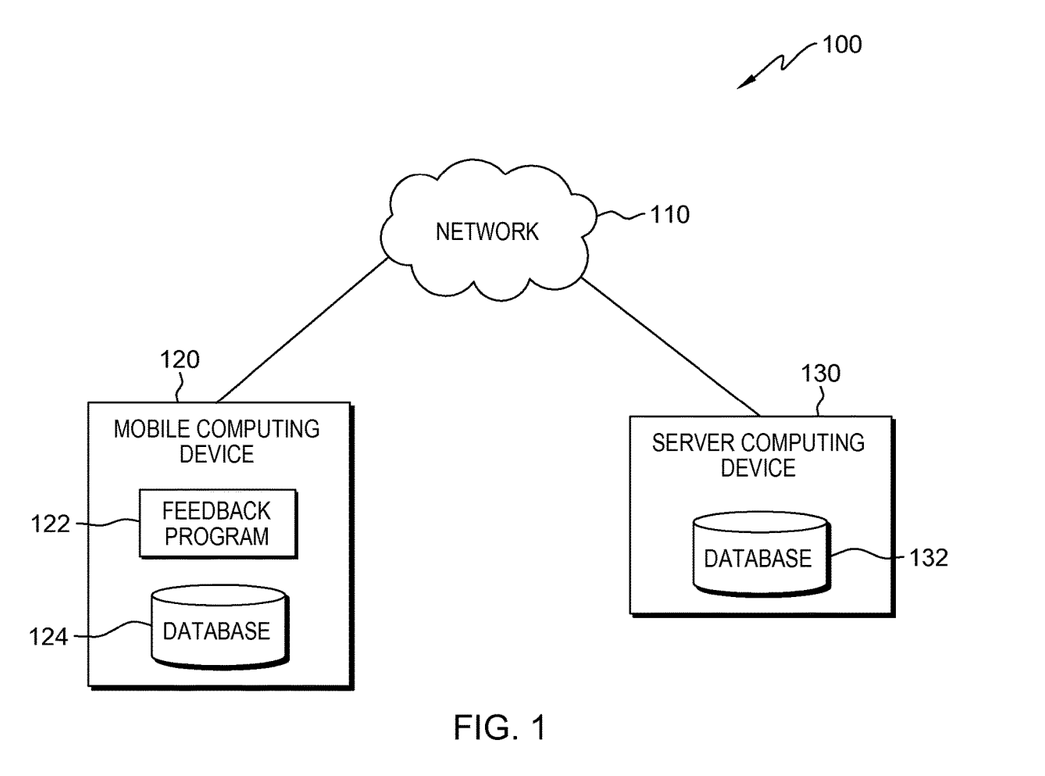
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of one implementation and does not imply any limitations with regard to the environments in which different embodiments may be made by those skilled in the art without departing from the scope of the invention as recited by the claims.

Data processing environment 100 includes mobile computing device 120 and server computing device 130, interconnected via network 110. Network 110 can be, for example, a telecommunications network, a local area network (LAN), a wide area network (WAN), such as the Internet, or a combination of the three, and can include wired, wireless, or fiber optic connections. Network 110 may include one or more wired and/or wireless networks that are capable of receiving and transmitting data, voice, and/or video signals, including multimedia signals. In general, network 110 can be any combination of connections and protocols that will support communications between mobile computing device 120, server computing device 130, and other computing devices (not shown) within data processing environment 100.

In various embodiments, mobile computing device 120 can be a laptop computer, a tablet computer, a smartphone, or any mobile programmable electronic device capable of communicating with server computing device 130 via network 110, and with various components and devices (not shown) within data processing environment 100. Mobile computing device 120 may be a wearable computing device. Wearable computing devices are electronic devices that may be worn by the bearer under, with, or on top of clothing, as well as in glasses, hats, wigs, or other accessories, and are capable of receiving, processing, storing, sending, and displaying data. In general, mobile computing device 120 represents any programmable electronic device capable of executing machine readable program instructions and communicating with other computing devices via a network, such as network 110. Mobile computing device 120 includes at least a camera and at least the following capabilities: record video, play video, record audio, and play audio. In some embodiments, mobile computing device 120 includes a capability to observe and record real time skeletal tracking, for example, through the use of sensor data obtained via one or more sensors connected or attached to the user or an instrument or tool the user is operating. In an embodiment, mobile computing device 120 is a wearable computing device such as augmented reality glasses. Mobile computing device 120 includes feedback program 122 and database 124. Mobile computing device 120 may include internal and external hardware components, as depicted and described with respect to computer system 300 in FIG. 3.

In various embodiments, feedback program 122 retrieves information on an idealized motion or muscular skeletal coordination associated with an ideal performance of a detected user activity, and provides feedback to the user based on the information retrieved and an observed muscular-skeletal coordination performed by the user during the activity. An ideal performance of a user activity is a performance of the activity that the user is striving to achieve, for example, through practice and/or instruction. An ideal performance may be an original performance by a composer or musician, or instructions on a performance by a teacher, coach, or instructor. Feedback program 122 provides a user operating mobile computing device 120 with live feedback of the user performing an activity. In an embodiment, mobile computing device 120 is a wearable device, and the user operates the device 120 while concurrently performing an activity, such as playing a musical instrument, learning a sport or skill, or learning sign language. Feedback program 122 identifies the user activity, and retrieves data associated with the user activity, for example, a proper or ideal performance of the skill or instructions on learning how to perform the skill Feedback program 122 records audio and/or video or still images, via a camera on mobile computing device 120, of the user performing the activity, and based on the retrieved data, provides live feedback to the user based on the user performance of the activity. The feedback may include audio feedback or visual feedback, such as one or more messages indicating a correct next musical note in a musical performance, or the feedback may include a visual display of a proper hand placement to perform the next note. In various embodiments, feedback program 122 provides feedback overlaid on video or image input to mobile computing device 120, for example, a hand placement superimposed on the user's current hand placement. Feedback program 122 determines whether the user is performing the activity in the proper or ideal manner, and if a mistake is made or the user deviates from the ideal performance of the identified activity, feedback program 122 transmits information of the deviation to the user.

Database 124 resides on mobile computing device 120. A database is an organized collection of data. Database 124 can be implemented with any type of storage device capable of storing data that can be accessed and utilized by mobile computing device 120, such as a database server, a hard disk drive, or a flash memory. In other embodiments, database 124 can represent multiple storage devices within data processing environment 100 or within mobile computing device 120. Database 124 stores information for use with feedback program 122, for example, user profile information, including user identifying information, and user activity or interest information. In an embodiment, database 124 can store retrieved data on one or more ideal performances of a previous user activity corresponding to a user profile for retrieval by feedback program 122.

In various embodiments, server computing device 130 can be a standalone computing device, management server, a web server, a mobile computing device, or any other electronic device or computing system capable of receiving, sending, and processing data. In other embodiments, server computing device 130 can represent a server computing system utilizing multiple computers as a server system. In another embodiment, server computing device can be a laptop computer, a tablet computer, a netbook computer, a personal computer, a desktop computer, or any programmable electronic device capable of communicating with other computing devices (not shown) within data processing environment 100 via network 110. In another embodiment, server computing device 130 represents a computing system utilizing clustered computers and components (e.g., database server computers, application server computers, etc.) that act as a single pool of seamless resources when accessed within data processing environment 100. Server computing device 130 includes database 132. In various embodiments, the database included on server computing device 130 may be located elsewhere within data processing environment 100 with access to server computing device 130 via network 110.

Database 132 resides on server computing device 130. A database is an organized collection of data. Database 132 can be implemented with any type of storage device capable of storing data that can be accessed and utilized by server computing device 130, such as a database server, a hard disk drive, or a flash memory. In other embodiments, database 132 can represent multiple storage devices within data processing environment 100 or within server computing device 130. Database 132 stores information for use in operation with feedback program 122, for example, retrieved information corresponding to one or more user activities, such as videos, audio, or instructions for proper or ideal performance of various activities.

Figure 2:
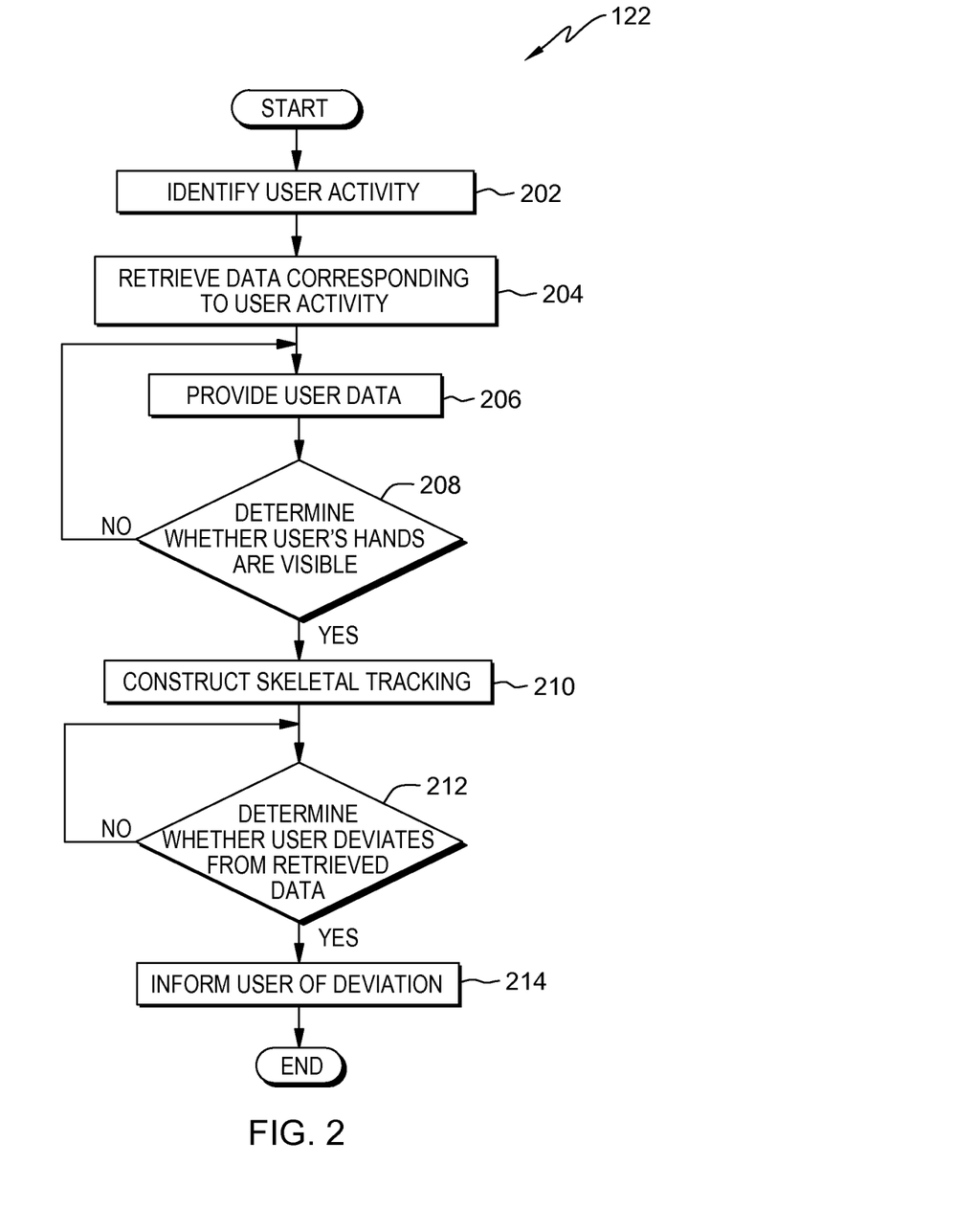
FIG. 2 is a flowchart depicting operational steps of a feedback program, for retrieving information on a user activity and providing feedback to the user based on the information retrieved, in accordance with an embodiment of the present invention.

FIG. 2 is a flowchart depicting operational steps of feedback program 122, for retrieving information on a user activity and providing feedback to the user based on the information retrieved, in accordance with an embodiment of the present invention.

Feedback program 122 identifies a user activity (step 202). In various embodiments, a user operates a wearable computing device, for example, mobile computing device 120, while concurrently performing an activity, such as playing a musical instrument, or learning a skill such as knitting or keyboard typing. Feedback program 122 utilizes recording capabilities of mobile computing device 120, e.g., a camera, to record video and audio of the user activity. Feedback program 122 identifies or detects the user activity based on, for example, an analysis of text in the video recording, or a comparison of the audio recording to known musical or other audio. In an embodiment, feedback program 122 identifies the user activity by comparing actions taken in a video to videos of actions in a database, such as database 132. For example, feedback program 122 can compare a user video of a user performing one or more specific actions to stored videos, and identify the user activity as karate. Feedback program 122 can use information available via network 110, such as web applications and information stored in database 132. In another embodiment, a user can input the activity to feedback program 122. In yet another embodiment, a user can store profile information in database 124, such profile information including user identification and the user's interests or activities. Feedback program 122 may identify a user operating mobile computing device 120, and based on the user profile information, may then identify an activity of the user. In some embodiments of the present invention, data processing environment 100 includes one or more sensors attached or connected to the user or an instrument or tool the user is operating or otherwise utilizing to perform the detected or identified activity. In various other embodiments, mobile computing device 120 includes a sensor with an infrared emitter and camera, which can project a pattern of infrared light to detect user actions within a field of view or range of the sensor, for example, in order to perform skeletal tracking operations.

Feedback program 122 retrieves data corresponding to the user activity (step 204). Feedback program 122 may retrieve data corresponding to the user activity via network 110, for example, a recording of a musical performance available on the Internet, or data stored in database 124, for example, sheet music the user saved to mobile computing device 120. In various embodiments, the data retrieved is a correct, proper, or ideal way to perform the user activity and/or information on the user activity, and may be textual instructions, audio or video instructions, an audio or video recording by another, background or historical information on the user activity, etc. Data on the ideal way to perform the user activity may include idealized motion or muscular skeletal coordination associated with the idealized performance of the identified user activity.

Feedback program 122 provides the data to the user (step 206). The retrieved data is provided to the user in a display of mobile computing device 120, in any of a number of manners, for example, by overlaying an indicator in the display over a piano or keyboard key that is to be pressed next, or providing audio to the user to indicate a next key. In another example, feedback program 122 may provide additional information about the user activity in the display of mobile computing device 120 viewable by the user, such as text including the name of the musical note, key of the music, correct beats per minute, etc. The user may interact with feedback program 122, for example, by inputting a change from a six string guitar to a seven string guitar, and feedback program 122 may update a projected note placement on the guitar in the view of mobile computing device 120. In an embodiment, a delta between a correct audio performance and the user's audio performance may be displayed, allowing a teacher, coach, or the user to review the user's performance. In some embodiments, retrieved data on an ideal or correct performance may be optionally overlaid or interleaved via a heads up display or any other means of visual playback of real time video capture from the perspective of the user's point of view. In some embodiments, the heads up display may be used to display actual motion and/or coordinated muscular-skeletal movements of the user as observed by skeleton tracking equipment or one or more sensors.

Feedback program 122 determines whether the user's hands are visible (decision block 208). If the user's hands are not visible (decision block 208, "no" branch), then feedback program 122 continues to provide retrieved data to the user.

If the user's hands are visible (decision block 208, "yes" branch), then feedback program 122 constructs skeletal tracking (step 210). In various embodiments, feedback program 122 utilizes sensor data retrieved from one or more sensors attached or connected to the user and/or an instrument or tool the user is operating and/or mobile computing device 120. Feedback program 122 uses the sensor data to obtain a point cloud which is processed by a skeletal tracking device, in order to determine an approximate position of the skeleton of the user performing the activity. The approximate positions may include wrist position, finger bones and orientation of the fingers, and forearm bones. If feedback program 122 detects a user's hand or hands in the recorded video, then feedback program 122 can project a "shadow player" depicting an ideal posture or position of the user's hands in order to properly perform the user activity. This allows the user to see the difference, in real time, between the ideal position and the current position and make any needed adjustments. In an embodiment, feedback program 122 may display the shadow player in incremental positions, so as to ease the user into the ideal posture or position. Feedback program 122 may inform the user with a visual or audio message indicating a change to the user's posture for position, and may include an explanation of why or how the change may impact the user's performance of the activity.

Feedback program 122 determines, based on the retrieved data, whether the user deviates from the idealized motion (decision block 212). If the user deviates from the idealized motion (decision block 212, "yes" branch), then feedback program 122 informs the user of the deviation (step 214). Feedback program 122 determines whether a user deviates from the idealized motion of the body by comparing the user performance of the activity, for example, determined by real time skeletal tracking observation, with the retrieved data of the idealized skeletal motion of the identified user activity. Feedback program 122 may inform the user of the deviation or mistake by transmitting the information to a display of mobile computing device 120, or providing an audio or a visual message, in real time, displayed in the viewing area of mobile computing device 120. For example, if the user misses a musical note, feedback program 122 may highlight the note, or if the user's hands are not in a correct placement on a keyboard, feedback program 122 may depict the correct hand placement or highlight or otherwise indicate the correct keys on which the user's hands should be placed.

Figure 3:
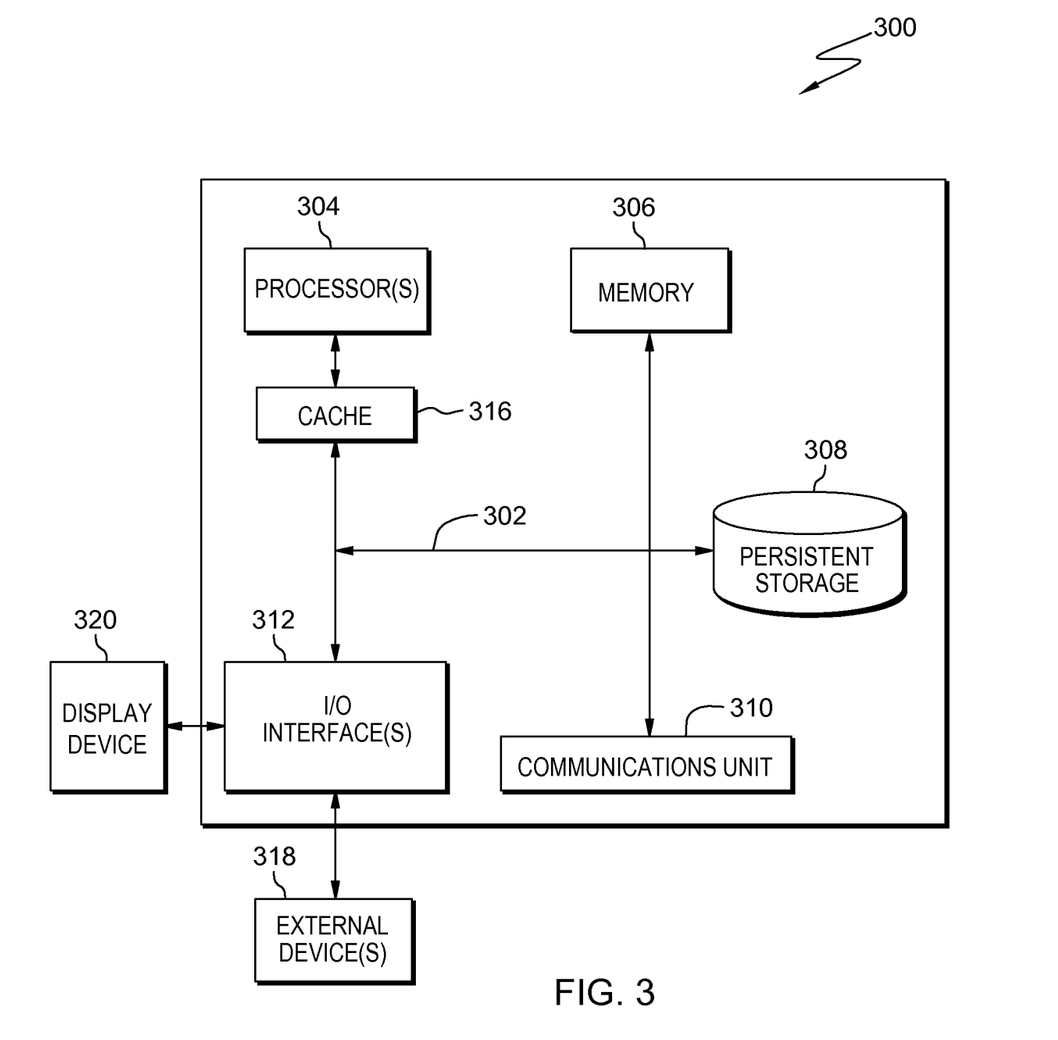
FIG. 3 is a block diagram of components of a data processing system, such as the mobile computing device of FIG. 1, in accordance with an embodiment of the present invention.

FIG. 3 depicts a block diagram of components of a computer system 300, which is an example of a system such as mobile computing device 120 of FIG. 1, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer system 300 includes computer processors(s) 304, cache 316, memory 306, persistent storage 308, communications unit 310, input/output (I/O) interface(s) 312, and communications fabric 302. Communications fabric 302 provides communications between cache 316, memory 306, persistent storage 308, communications unit 310, and I/O interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 316 is a memory that enhances the performance of processor(s) 304 by storing recently accessed data, and data near recently accessed data, from memory 306.

Program instructions and data used to practice embodiments of the present invention can be stored in persistent storage 308 for execution and/or access by one or more of the respective computer processor(s) 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices within data processing environment 100. In these examples, communications unit 310 includes one or more network interface cards. Communications unit 310 may provide communications through the use of either or both physical and wireless communications links. Program instructions and data used to implement embodiments of the present invention may be downloaded to persistent storage 308 through communications unit 310.

I/O interface(s) 312 allows for input and output of data with other devices that may be connected to mobile computing device 120. For example, I/O interface(s) 312 may provide a connection to external device(s) 318 such as a keyboard, a keypad, a camera, a touch screen, and/or some other suitable input device. External device(s) 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to a display 320. Display 320 provides a mechanism to display data to a user and may be, for example, a computer monitor or an incorporated display screen, such as is used, for example, in tablet computers, wearable computers, and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for providing feedback to a user using a wearable computing device, the computer program product comprising:
   one or more computer readable storage devices and program instructions stored on the one or more computer readable storage devices, the stored program instructions comprising:
   program instructions to identify an activity being performed by a user operating a wearable computing device, wherein identifying the activity includes retrieving sensor data from one or more sensors, the sensor data including real time skeletal tracking of the user, and wherein identifying the activity further includes identifying at least a comparison of an audio recording of the activity to known audio of a performance;
   program instructions to retrieve performance data associated with an ideal performance of the activity being performed by the user;
   program instructions to determine, based on the retrieved performance data and the activity being performed by the user, whether the user deviates from the retrieved performance data; and
   responsive to determining the user deviates from the retrieved performance data, program instructions to transmit, based on the retrieved performance data, performance feedback to the user, the performance feedback including a display of an ideal motion of skeletal coordination corresponding to an ideal position needed to perform the activity properly.

2. The computer program product of claim 1, further comprising:
   program instructions to determine whether at least one hand of the user is visible in the activity being performed by the user operating the wearable computing device; and
   responsive to determining at least one hand is visible in the activity, program instructions to display a proper hand placement in a display of the wearable computing device.

3. The computer program product of claim 1, wherein the performance feedback to the user is transmitted to a display of the wearable computing device.

4. The computer program product of claim 1, wherein the performance feedback to the user further includes an audio feedback.

5. The computer program product of claim 1, further comprising:
   program instructions to overlay the retrieved sensor data in a display of the wearable computing device.

6. The computer program product of claim 1, wherein the ideal performance data is one or more of: an original performance by another or provided instructions on a performance.

7. The computer program product of claim 1, wherein the program instructions to transmit performance feedback to the user further include program instructions to display a delta between the retrieved performance data and the activity being performed by the user.

8. A computer system for providing feedback to a user using a wearable computing device, the computer system comprising:
   one or more computer processors;
   one or more computer readable storage devices; and
   program instructions stored on the one or more computer readable storage devices for execution by at least one of the one or more computer processors, the stored program instructions comprising:
   program instructions to identify an activity being performed by a user operating a wearable computing device, wherein identifying the activity includes retrieving sensor data from one or more sensors, the sensor data including real time skeletal tracking of the user, and wherein identifying the activity further includes identifying at least a comparison of an audio recording of the activity to known audio of a performance;
   program instructions to retrieve performance data associated with an ideal performance of the activity being performed by the user;
   program instructions to determine, based on the retrieved performance data and the activity being performed by the user, whether the user deviates from the retrieved performance data; and
   responsive to determining the user deviates from the retrieved performance data, program instructions to transmit, based on the retrieved performance data, performance feedback to the user, the performance feedback including a display of an ideal motion of skeletal coordination corresponding to an ideal position needed to perform the activity properly.

9. The computer system of claim 8, further comprising:
   program instructions to determine whether at least one hand of the user is visible in the activity being performed by the user operating the wearable computing device; and
   responsive to determining at least one hand is visible in the activity, program instructions to display a proper hand placement in a display of the wearable computing device.

10. The computer system of claim 8, wherein the performance feedback to the user is transmitted to a display of the wearable computing device.

11. The computer system of claim 8, wherein the performance feedback to the user further includes an audio feedback.

12. The computer system of claim 8, wherein the ideal performance data is one or more of: an original performance by another or provided instructions on a performance.

13. The computer system of claim 8, wherein the program instructions to transmit performance feedback to the user further include program instructions to display a delta between the retrieved performance data and the activity being performed by the user.

\* \* \* \* \*